US012173540B2

(12) United States Patent
Salice

(10) Patent No.: US 12,173,540 B2
(45) Date of Patent: Dec. 24, 2024

(54) HINGE FOR DOOR LEAVES OF FURNITURE OR THE LIKE AND ITEM OF FURNITURE PROVIDED WITH SUCH HINGE

(71) Applicant: ARTURO SALICE S.P.A., Novedrate (IT)

(72) Inventor: Sergio Salice, Carimate (IT)

(73) Assignee: ARTURO SALICE S.P.A., Novedrate (IT)

( * ) Notice: Subject to any disclaimer, the term of this patent is extended or adjusted under 35 U.S.C. 154(b) by 299 days.

(21) Appl. No.: 17/627,875

(22) PCT Filed: Jul. 28, 2020

(86) PCT No.: PCT/EP2020/071322
§ 371 (c)(1),
(2) Date: Jan. 18, 2022

(87) PCT Pub. No.: WO2021/023587
PCT Pub. Date: Feb. 11, 2021

(65) Prior Publication Data
US 2022/0275671 A1 Sep. 1, 2022

(30) Foreign Application Priority Data
Aug. 6, 2019 (IT) ........................ 102019000014091

(51) Int. Cl.
*E05D 11/00* (2006.01)
*E05D 3/02* (2006.01)
*E05F 1/12* (2006.01)

(52) U.S. Cl.
CPC ............ *E05D 3/02* (2013.01); *E05D 11/0054* (2013.01); *E05F 1/1253* (2013.01)

(58) Field of Classification Search
CPC ....... E05D 3/02; E05D 11/0054; E05F 1/1253
See application file for complete search history.

(56) References Cited

U.S. PATENT DOCUMENTS 5,655,261 A * 8/1997 Cress .................. E05D 11/1014 16/335
8,561,262 B1 * 10/2013 Liang ........................ E05F 5/04 16/296
9,163,447 B1 * 10/2015 Liang ...................... E05F 5/006
9,169,681 B2 * 10/2015 Cooper ..................... E05D 3/14
(Continued)

OTHER PUBLICATIONS

International Search Report dated Oct. 16, 2020 issued in PCT/EP2020/071322.
(Continued)

*Primary Examiner* — Jason W San
(74) *Attorney, Agent, or Firm* — Scully, Scott, Murphy & Presser, P.C.

(57) ABSTRACT

A hinge for door leaves of furniture which comprises a fixed part which is connectable to a side wall of the item of furniture and a movable part which is connectable to a door leaf, which are mutually connected so as to oscillate by at least one articulation axis; and a movement control device for controlling a closing/opening movement of the hinge, in the form of a damping device for damping the closing movement of the hinge or of an elastic opening device for opening the hinge. The fixed part of the hinge has a flat housing body that extends along a plane parallel to or passing through the articulation axis, the body of the fixed part being shaped so as to be insertable and fixable in a flat seat which is provided in a thickness of the side wall of the item of furniture.

17 Claims, 9 Drawing Sheets

(56) References Cited

U.S. PATENT DOCUMENTS

| | | | | |
|---|---|---|---|---|
| 11,078,705 | B2 * | 8/2021 | Salice | E05F 1/1246 |
| 2003/0233731 | A1 * | 12/2003 | Cotton | E05D 11/0054 16/250 |
| 2011/0225768 | A1 * | 9/2011 | Haemmerle | E05F 5/006 16/49 |
| 2011/0298349 | A1 * | 12/2011 | Sutterlutti | E05F 5/006 16/352 |
| 2012/0174338 | A1 * | 7/2012 | Wu | E05F 5/08 16/297 |
| 2013/0145580 | A1 * | 6/2013 | Brunnmayr | E05F 5/006 16/84 |
| 2013/0160242 | A1 * | 6/2013 | Brunnmayr | E05F 5/006 16/85 |
| 2013/0239363 | A1 * | 9/2013 | apur | E05F 5/006 16/50 |
| 2014/0352111 | A1 * | 12/2014 | Ng | E05F 5/006 16/286 |
| 2014/0366322 | A1 * | 12/2014 | Salice | E05F 5/02 16/277 |
| 2015/0300065 | A1 * | 10/2015 | Cooper | E05D 11/0054 16/250 |
| 2016/0138319 | A1 * | 5/2016 | Wu | E05D 3/02 16/50 |
| 2016/0153224 | A1 * | 6/2016 | Salice | E05D 3/16 16/65 |
| 2018/0135344 | A1 * | 5/2018 | Liang | E05D 3/142 |
| 2018/0252016 | A1 | 9/2018 | Salice | |
| 2019/0071908 | A1 * | 3/2019 | Salice | E05D 3/142 |
| 2019/0136596 | A1 | 5/2019 | Tassi et al. | |
| 2020/0173216 | A1 * | 6/2020 | Salice | E05D 5/065 |
| 2021/0230922 | A1 * | 7/2021 | Salice | E05D 3/16 |
| 2022/0275671 | A1 * | 9/2022 | Salice | E05F 1/1253 |

OTHER PUBLICATIONS

Written Opinion dated Oct. 16, 2020 issued in PCT/EP2020/071322.

Italian Search Report and Written Opinion dated Apr. 23, 2020 issued in IT 201900014091, with partial translation.

* cited by examiner

HINGE FOR DOOR LEAVES OF FURNITURE OR THE LIKE AND ITEM OF FURNITURE PROVIDED WITH SUCH HINGE

The invention relates to a hinge for door leaves of furniture or the like, in particular a hinge that when mounted is substantially invisible, and also relates to an item of furniture provided with such hinges.

In the furniture sector, in order to support door leaves of furniture so as to oscillate, in general the use is made of hinges that comprise a fixed part or arm, which can be fixed to an inner side surface of a side wall of the body of the item of furniture, and a movable part, which is constituted by a box-like body that can be connected to the door leaf, and both parts are mutually articulated so that they can oscillate via a rotation axis or by way of an articulation system that comprises articulation axes and connecting rockers.

However, such conventional hinges present some drawbacks of a functional nature, in that the fixed parts of the hinges, once fixed on the side walls of the item of furniture, occupy a considerable space which can result in limitations on using the space inside the item of furniture and on mounting drawers inside the item of furniture; furthermore the presence of the fixed parts of the hinges on the side wall of the item of furniture can also be unattractive from the aesthetic point of view.

In order to overcome the above mentioned drawbacks, hinges of the invisible type have been proposed, which comprise a fixed part which is shaped so as to be insertable and fixable by way of screws in a seat provided in the thickness of the upper wall or of the lower wall of the item of furniture, and a movable part which is connected to the fixed part by way of flat rockers which extend along a plane perpendicular to the respective articulation axes, so as to reduce the vertical space occupation of the fixed part of the hinge.

However, such a solution makes it possible to mount only two hinges for each door leaf, one in the upper wall and one in the lower wall of the item of furniture; this does not make it possible to support door leaves of considerable weight and dimensions, thus implying a major limitation on the possibilities for use of such hinges.

Furthermore, these hinges also have problems linked to the fixing thereof in the seats of the upper and lower walls, in that it is necessary to carry out complex machining operations on the walls of the item of furniture in order to suitably shape those seats in order to allow the engagement of the fixing screws; furthermore, especially for door leaves of considerable dimensions, the insertion and fixing via screws of the fixed parts in the seats of the walls is a difficult matter.

The aim of the present invention is to provide a hinge for door leaves of furniture or the like, which is of the invisible type and which offers a high versatility of use, in particular enabling use even with door leaves that have considerable weight and dimensions.

Within this aim, an object of the present invention is to provide a hinge of the type mentioned above, which can be affixed to the item of furniture in a simple and rapid manner and which in terms of construction is less complex than the conventional solutions.

Another object of the present invention is to provide an item of furniture that is configured to allow the application of hinges of the invisible type which offer a high versatility of use.

This aim and these and other objects which will become better apparent hereinafter are achieved by a hinge for door leaves of furniture which comprises a fixed part which is connectable to a side wall of the item of furniture and a movable part which is connectable to a door leaf, the fixed part and the movable part being mutually connected so as to oscillate by at least one articulation axis, the hinge further comprising a movement control device for controlling the closing/opening movement of the hinge, said movement control device being in particular in the form of a damping device for damping the closing movement of the hinge or of an elastic opening device for opening the hinge, characterized in that said fixed part of the hinge has a substantially flat housing body that extends along a plane parallel to or passing through said articulation axis, said body of the fixed part being shaped so as to be insertable and fixable in a flat seat which is provided in the thickness of said side wall of the hinge.

Further characteristics and advantages of the present invention are further defined in the dependent claims.

The characteristics and the advantages of the present invention will become better apparent from the following description of some preferential, but non-limiting, embodiments of the hinge for door leaves of furniture, with reference to the accompanying drawings wherein.

Figure 1:
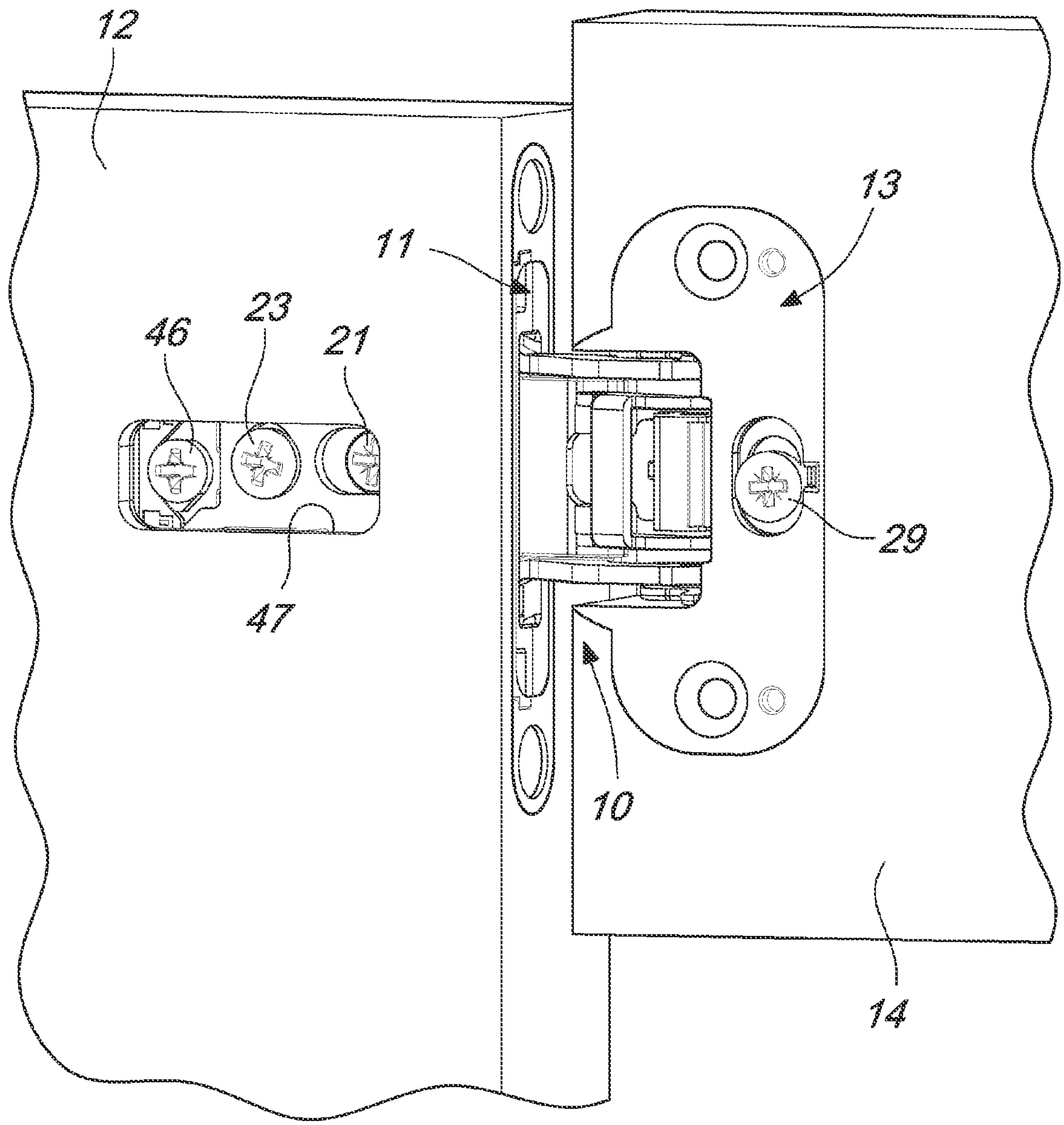
FIG. 1 is a perspective view of a first embodiment of the hinge according to the present invention, mounted in an item of furniture.
Figure 3:
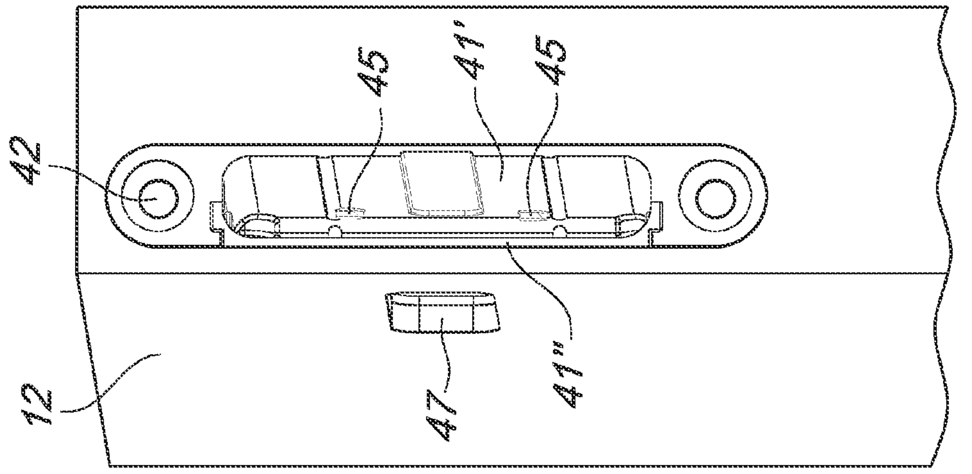
FIG. 3 is a perspective view of the side wall of FIG. 2, showing a retaining element fixed in the seat in order to permit the rapid coupling of the fixed part of the hinge.
Figure 2:
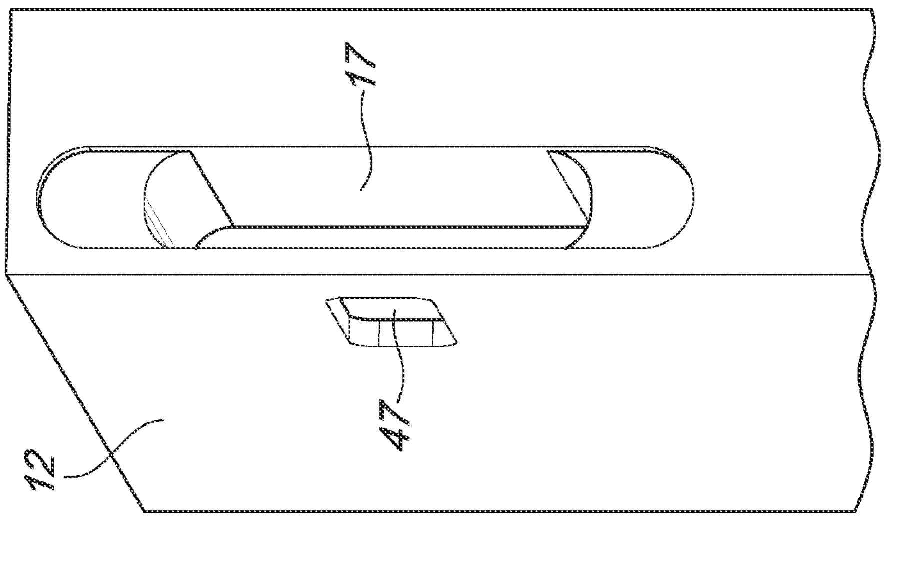
FIG. 2 is a perspective view of the side wall of the item of furniture, showing the seat provided in the thickness, open on a front side of the wall, for the insertion of the fixed part of the hinge.
Figure 4:
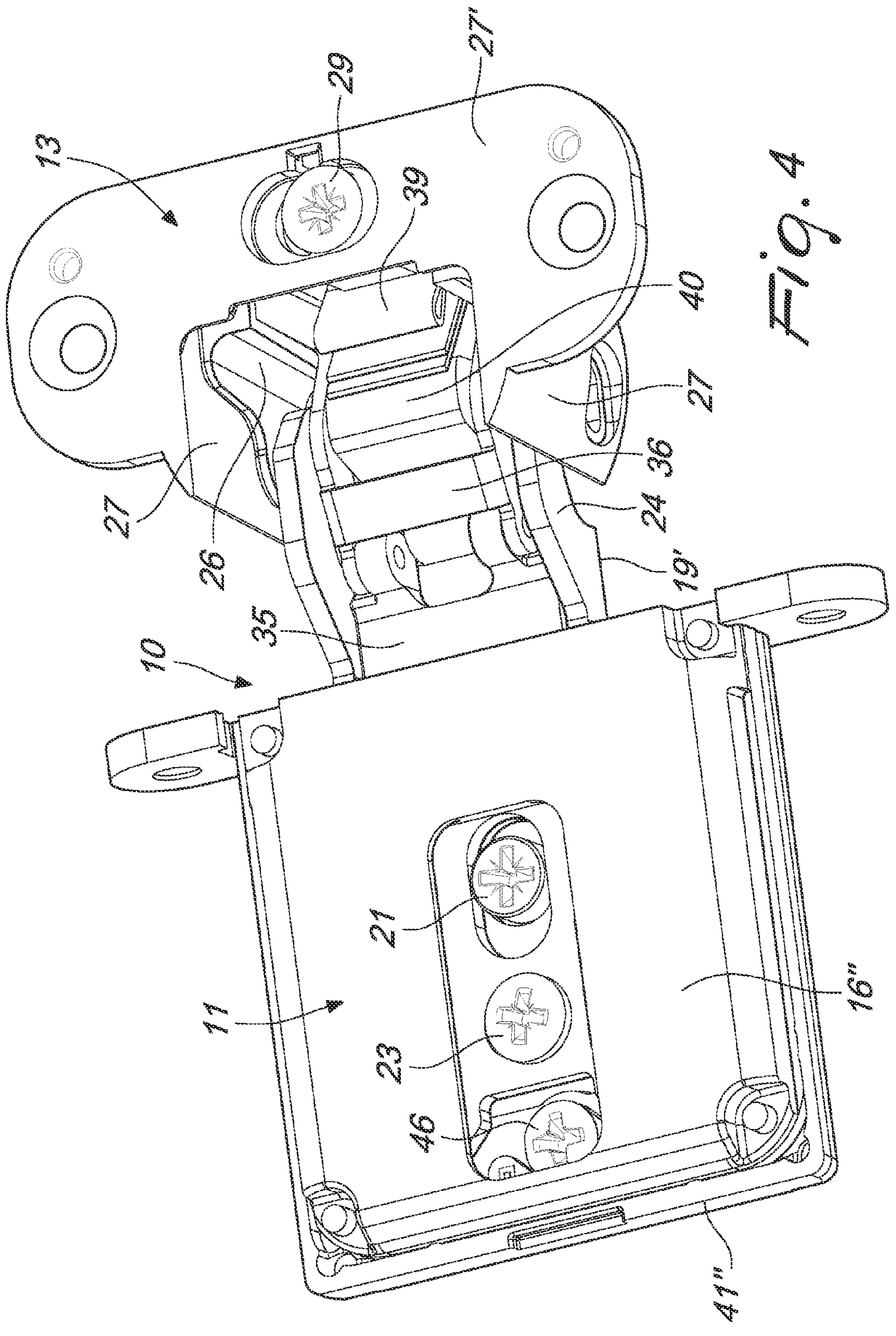
FIG. 4 is a perspective view of the hinge of FIG. 1, in which the fixed part is shown inserted in one of the two half-shells that form the retaining element.
Figure 5:
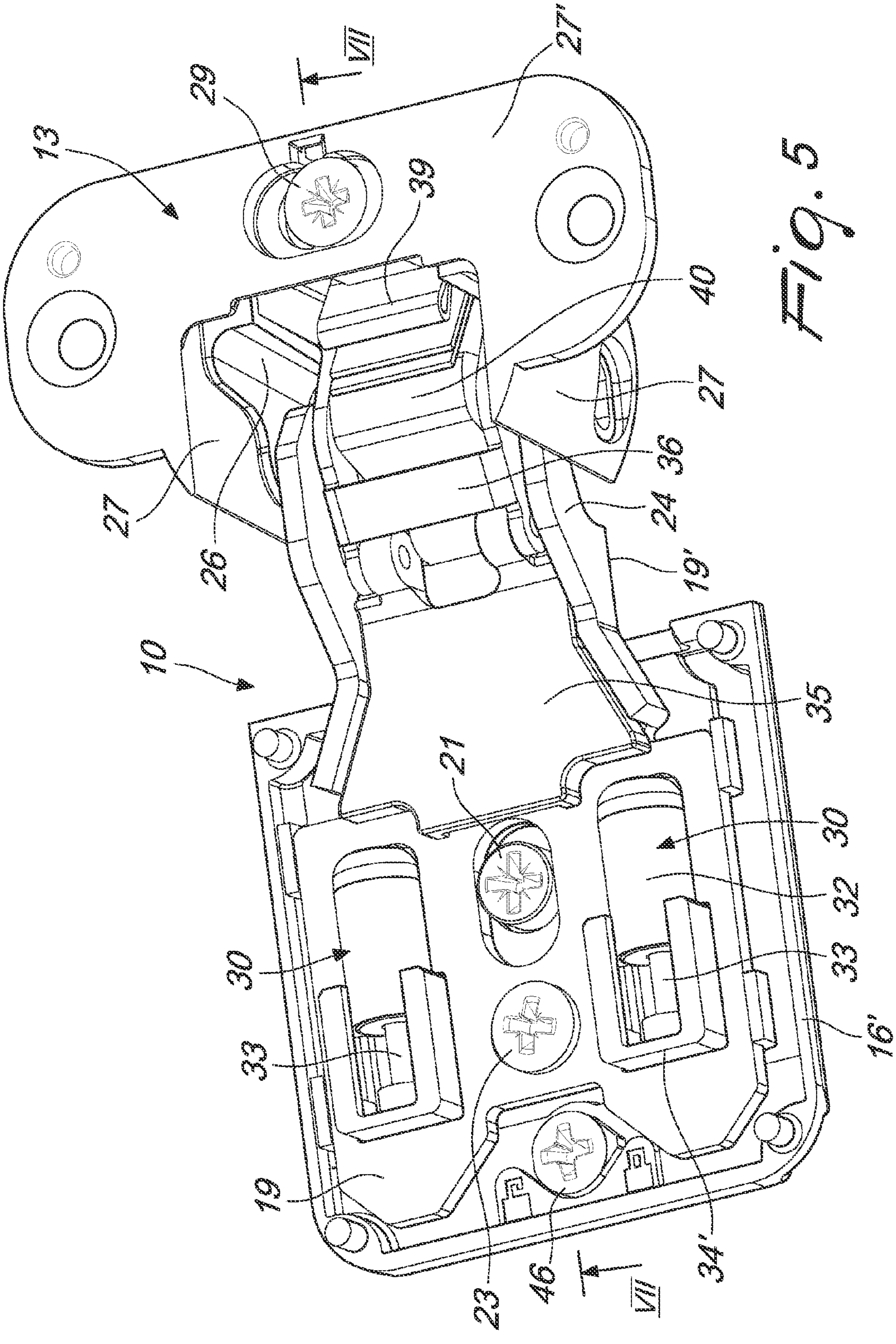
FIG. 5 is a perspective view of the hinge of FIG. 1 in the open position, in which one of the two parts of the body has been removed from the fixed part.

With reference to the figures, the hinge for door leaves of furniture according to a first embodiment of the present invention, generally designated by the reference numeral 10, comprises a fixed part 11 which is connectable to a side wall 12 of an item of furniture and a movable part 13 which is connectable to a door or door leaf 14 of the item of furniture; the fixed part 11 and the movable part 13 are mutually connected so as to oscillate by at least one articulation axis, for example by an articulation axis 15 as in the embodiment shown, or by an articulation system of the conventional type comprising four or more articulation axes and two or more connecting levers.

The hinge likewise comprises a control device for controlling the closing/opening movement of the hinge; in the embodiment shown, the movement control device comprises in particular a damping device for damping the closing movement of the hinge and in such case the hinge likewise comprises elastic closing means for closing such hinge, as explained below.

According to the present invention, the fixed part 11 of the hinge has a substantially flat housing body 16', 16" that extends along a plane parallel to or passing through the articulation axis 15, the body 16', 16" of the fixed part 11 being shaped so as to be insertable and fixable in a flat seat 17 which is provided in the thickness of the side wall 12 of the item of furniture, in which the flat seat 17 extends coplanar with that side wall 12.

In the preferred embodiment of the present invention, the movement control device is shaped in order to be arranged in the flat body 16', 16" of the fixed part 11 of the hinge and is functionally connected to the movable part 13 of the hinge 10.

Preferably the housing body 16', 16" is formed by two flat half-shells 16', 16" that can be mutually coupled, for example by bayonet coupling or the like, and which define an internal space for accommodating the movement control device and other components of the hinge.

In particular, a first element and a second element of the fixed part are arranged inside the half-shells 16', 16", in particular in the form of a first plate 18 and a second plate 19 which are movable and adjustable with respect to each other and with respect to the half-shells 16', 16".

Figure 8:
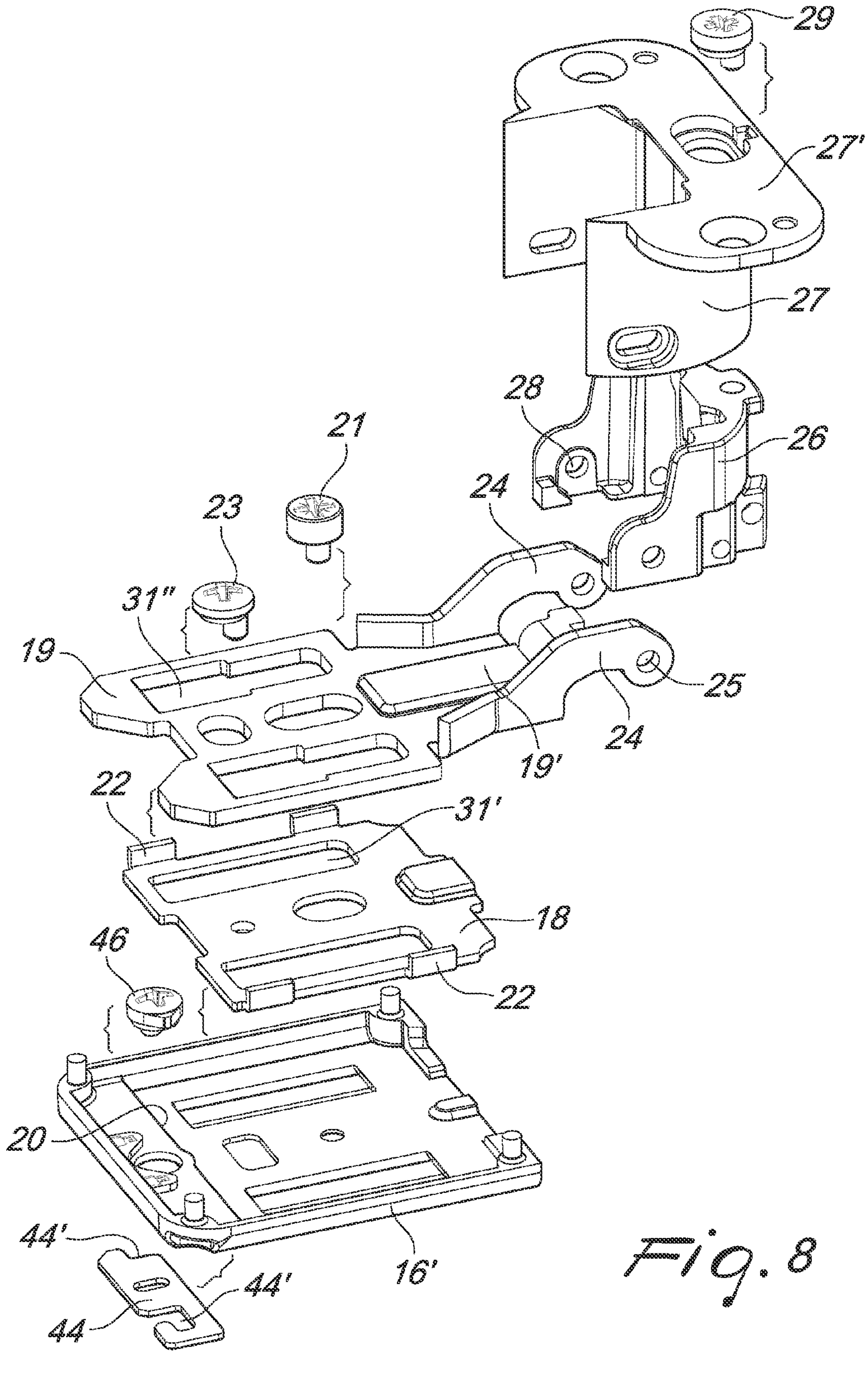
FIG. 8 is an exploded view of the principal parts of the hinge of FIG. 5.

As better illustrated in FIG. 8, the half-shell 16' has an accommodation seat 20 in which the first plate 18 is arranged so that it can move parallel to the articulation axis 15 and be shifted by way of a first cam screw 21 or other actuation element in order to allow the vertical adjustment of the door leaf 14.

The first plate 18 is provided above and below with folded portions 22 which define a sliding seat for the second plate 19, which can slide with respect to the first plate 18 in a direction perpendicular to the articulation axis 15 and can be shifted by way of a second cam screw 23 in order to allow the frontal adjustment of the door leaf 14.

The possibility is not ruled out that the plates 18, 19 can be movable and adjustable in different directions, for example the first plate 18 can be movable perpendicular to the articulation axis 15 and the second plate 19 can be movable parallel to that axis 15.

The second plate 19 has an extension 19' that ends with two mutually parallel flat arms 24 which have coaxial holes 25 in which the articulation axis 15 is inserted.

The articulation axis 15 is connected so as to oscillate with the movable part 13, which is preferably constituted by two bodies 26, 27 which can move with respect to each other in order to allow the lateral adjustment of the door leaf 14.

In particular, the movable part 13 comprises a first body 26 which has coaxial holes 28 for oscillating connection to the articulation axis 15, and also comprises a second body 27 which is connected to the first body 26 in order to be able to slide in a direction perpendicular to the axis 15 and parallel to a flange 27' of the second body 27 for the fixing thereof to the door leaf 14; the sliding of the second body 27 with respect to the first body 26 is controlled by a third cam screw 29.

The damping device for damping the closing movement of the hinge, in the preferred embodiment shown, comprises at least one fluid-operated damper, for example oil-operated, which is arranged in a corresponding seat provided in at least one of the plates 18, 19 so as to be substantially coplanar to the respective plate 18, 19.

Preferably, there are two oil-operated linear dampers 30 arranged mutually parallel in respective seats provided in at least one of the plates 18, 19 and substantially coplanar to those plates 18, 19; in the embodiment shown, both of the plates 18, 19 have seats 31', 31" for the dampers 30.

Each damper 30 comprises a cylinder 32 directed toward the extension 19' of the plate 19, and also comprises a stem 33 which extends from the cylinder 32 in the opposite direction to the extension 19'; there is also a spring, not shown, for rearming the stem 33, which can be arranged inside the cylinder 32 or coaxial with the stem 33.

The cylinder 32 is supported so that it can slide by a supporting element 34 which can be fixed in the seat 31" of the second plate 19, and the stem 33 extends into this supporting element 34 so as to abut against an end wall 34' of the element 34.

The dampers 30 are actuated by a drive element 35 which is functionally connected to the movable part 13 of the hinge; preferably the drive element 35 is in the form of a flat element that is arranged at the extension 19' of the second plate 19 and which can move so that it can slide parallel to the plate 19 and therefore along the plane of the body 16', 16" of the fixed part 11, so as to be able to act on the cylinders 32 of the dampers 30 in order to compress those dampers 30.

Figure 6:
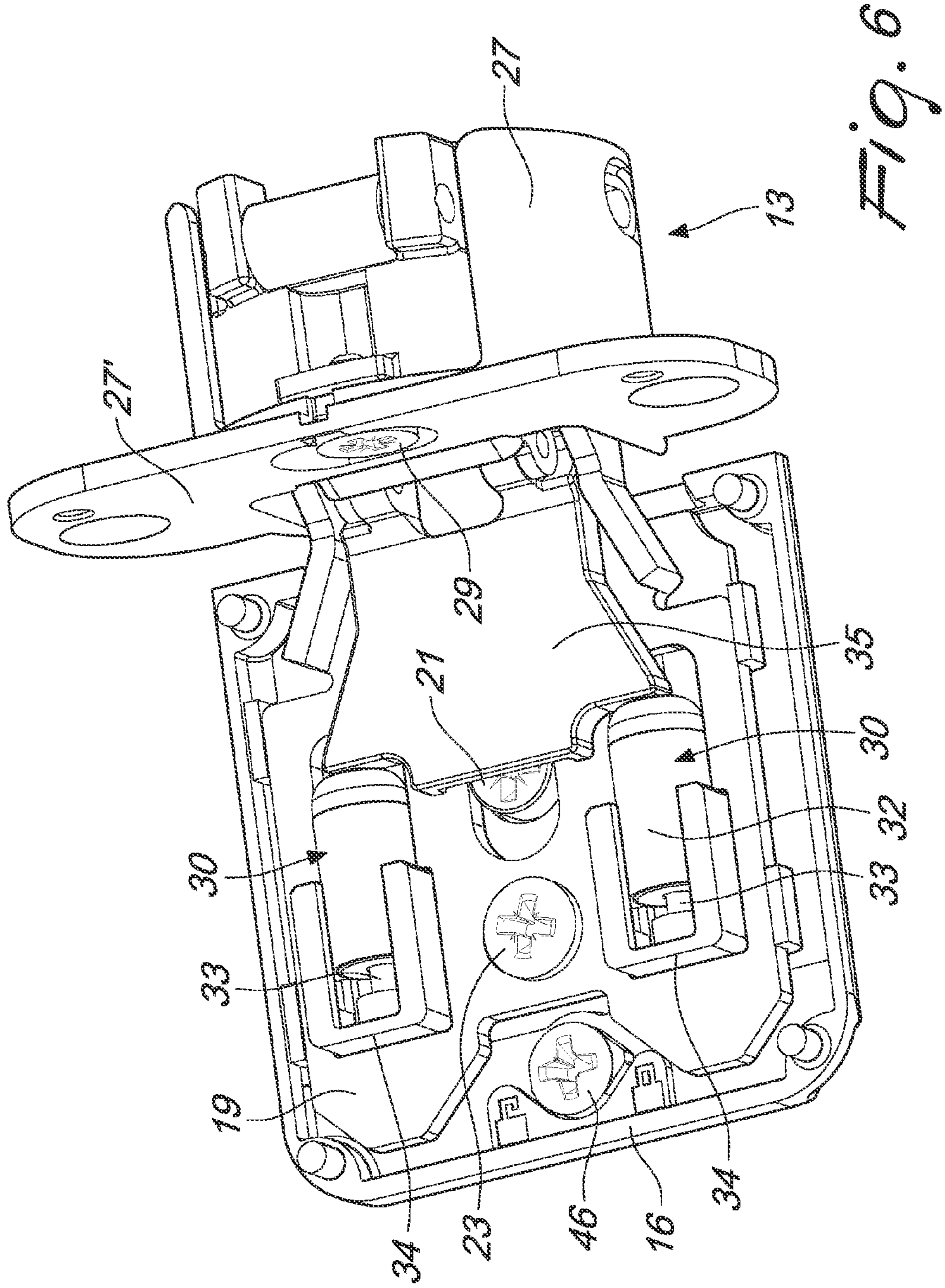
FIG. 6 shows the hinge of FIG. 5 in the closed position.
Figure 7:
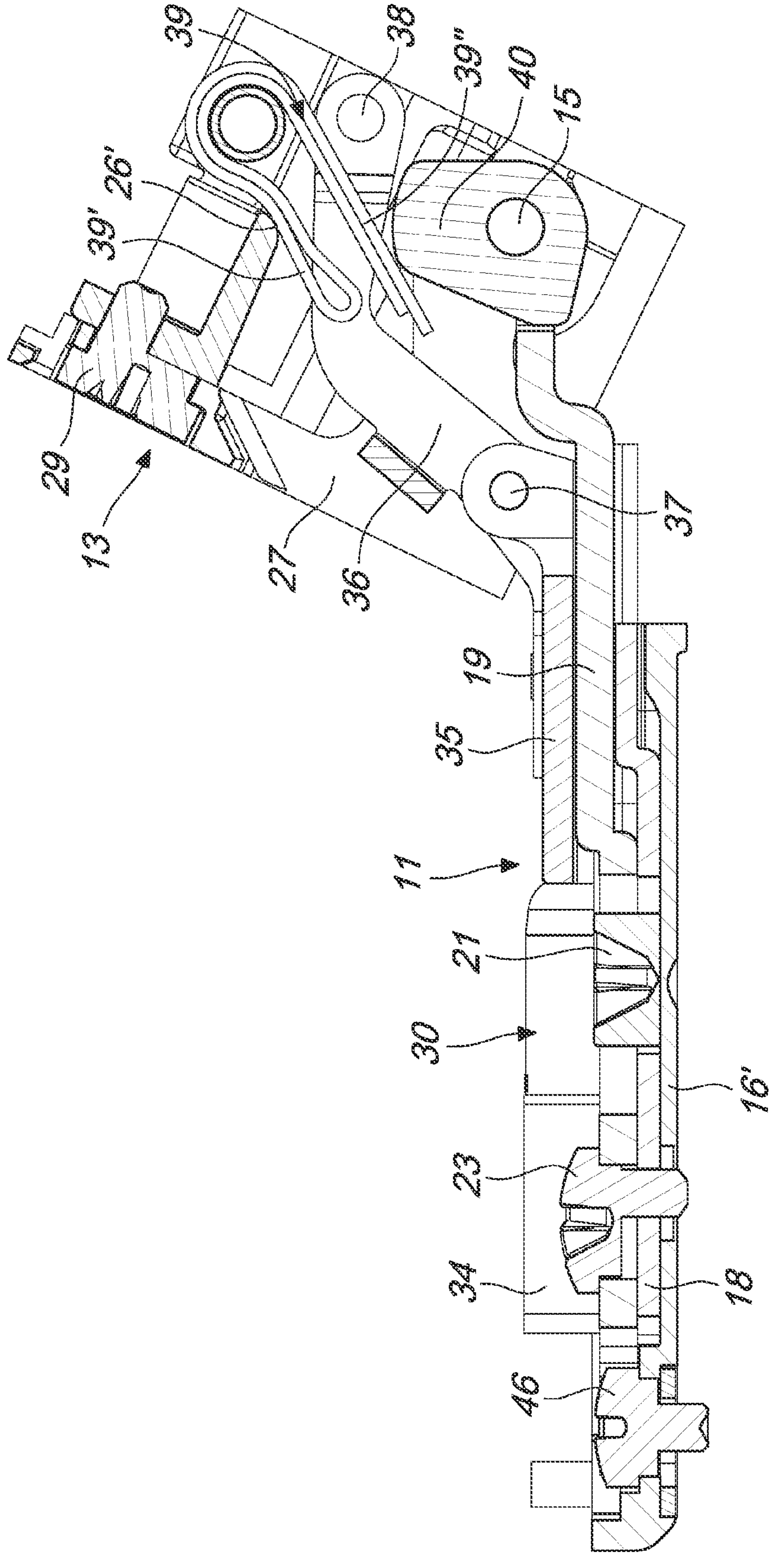
FIG. 7 is a longitudinal cross-sectional view of the hinge of FIG. 5 taken along the line VII-VII.

Preferably the drive element 35 is functionally connected to the movable part 13 by a connecting lever 36 which is connected in an articulated manner to the drive element 35 by an axis 37 and to the movable part 13, in particular to the first body 26 of the movable part 13, by an axis 38 that is spaced apart from the articulation axis 15 of the hinge, so as to define a crank mechanism that is capable of compressing the dampers 30 during the closing movement of the hinge, in particular along the final 25°-35° of the closing movement up until the fully closed position shown in FIG. 6.

The possibility is not ruled out that the drive element can be of another type, for example an oscillating lever or a moveable cam inside the fixed part 11, and that the functional connection with the movable part 13 of the hinge can be obtained by way of a different transmission system.

Likewise, the possibility is not ruled out that the arrangement of the dampers 30 can be inverted, i.e. the cylinders 32 are fixed in the supporting elements 34 and the stems 33 are directed toward the drive element 35 in order to be actuated by the latter directly or indirectly via tip elements arranged on the stems 33 themselves.

In order to bring the hinge 10 to the closed position and keep it in that position until the intervention of a user, as mentioned the hinge 10 comprises elastic closing means, which preferably comprise a V-shaped spring 39, of the leaf or metallic wire type, arranged in the movable part 13, in particular in the first body 26; the spring 39 has a first elastic arm 39' which rests on a fixed abutment surface 26' of the body 26 and a second elastic arm 39" which acts on a cam 40, which is supported by the second plate 19 of the fixed part 11 at the articulation axis 15 and is shaped so as to generate a force acting in the direction of closure starting from an opening angle for example comprised between 30° and 45°.

So as to rapidly mount the hinge in the item of furniture, preferably the housing body 16', 16" of the fixed part 11 has fastening means which can be fastened to at least one hollow retaining element, preferably formed by two half-shells 41', 41" which can be connected to each other by bayonet or sliding coupling, which is fixable in the seat 17 provided in the thickness of the side wall 12 by way of screws which can be inserted in holes 42 provided in lateral flanges 43 of the retaining element 41', 41".

Alternatively, the retaining element can be fixed in the seat 17 by way of adhesive bonding or by way of interlocking engagement means or means of another type.

The fastening means of the housing body 16', 16" preferably comprise a fastening plate 44 which is supported so that it can move on an outer side of one of the half-shells 16' and is provided with at least one hook 44' in order to be engageable with at least one engagement protrusion or tooth 45 which is provided inside the hollow retaining element 41', 41".

Preferably the fastening plate 44 can move parallel to the articulation axis 15 and is controllable by a cam screw 46 which is engageable between the half-shell 16' and that plate 44; the possibility is not ruled out however that the fastening plate can be contoured or movable in a different manner.

In order to facilitate the insertion of the housing body 16', 16" into the hollow retaining element 41', 41", preferably there are conical or inlet surfaces on the housing body 16', 16" and/or on the hollow retaining element 41', 41".

The possibility is not ruled out that the housing body 16', 16" of the fixed part of the hinge can be inserted and fixed directly in the seat 17 of the side wall 12 of the item of furniture without the use of the hollow retaining element; the fixing can for example happen by way of screws arranged in adapted lateral flanges of the body 16', 16" and engageable directly in the wall 12, or by way of one or more shanks provided on a rear side of the body 16', 16" which are fixable to the side wall 12 by way of pressure or by way of screws inserted into holes provided in the side surface of the wall 12 so as to engage in corresponding side holes of the shanks which are conveniently shaped with conical surfaces or the like in order to preferably also generate an additional pull that is capable of rendering the fixing stable and precise.

In the embodiment shown, the flat seat 17 provided in the thickness of the side wall 12 has an insertion opening for the fixed part 11 of the hinge which opens only on the front side of the side wall 12; in this case the side wall 12 has an access window 47 on an inner side for access to adjustment and/or fixing members of the hinge, in particular to the cam screws 21, 23, 46, such window 47 being closeable by way of a cover, not shown.

Alternatively it is possible for the flat seat 17 to also be open on an inner or outer side of the side wall 12 of the item of furniture; in this case mounting the fixed part 11 of the hinge can happen not only with the frontal insertion thereof into the seat 17 but also by way of placing the fixed part 11 of the hinge beside the seat 17 and inserting it laterally.

In this case the fixing can happen for example by having a peripheral flange on one of the two accommodation bodies 16', 16", which is provided with holes for inserting screws that can engage in the side wall 12 of the item of furniture.

Furthermore, a cover will be provided to cover the side opening of the flat seat 17, to be applied and fixed to the hinge or to the side wall once the hinge is inserted and fixed in the seat 17.

By virtue of the configuration of the hinge according to the invention, it is possible to support door leaves of considerable weight and dimensions, in that it is possible to mount more than two hinges on the item of furniture, for example three or more hinges, by providing a corresponding number of flat seats in the side walls of the item of furniture.

Figure 9:
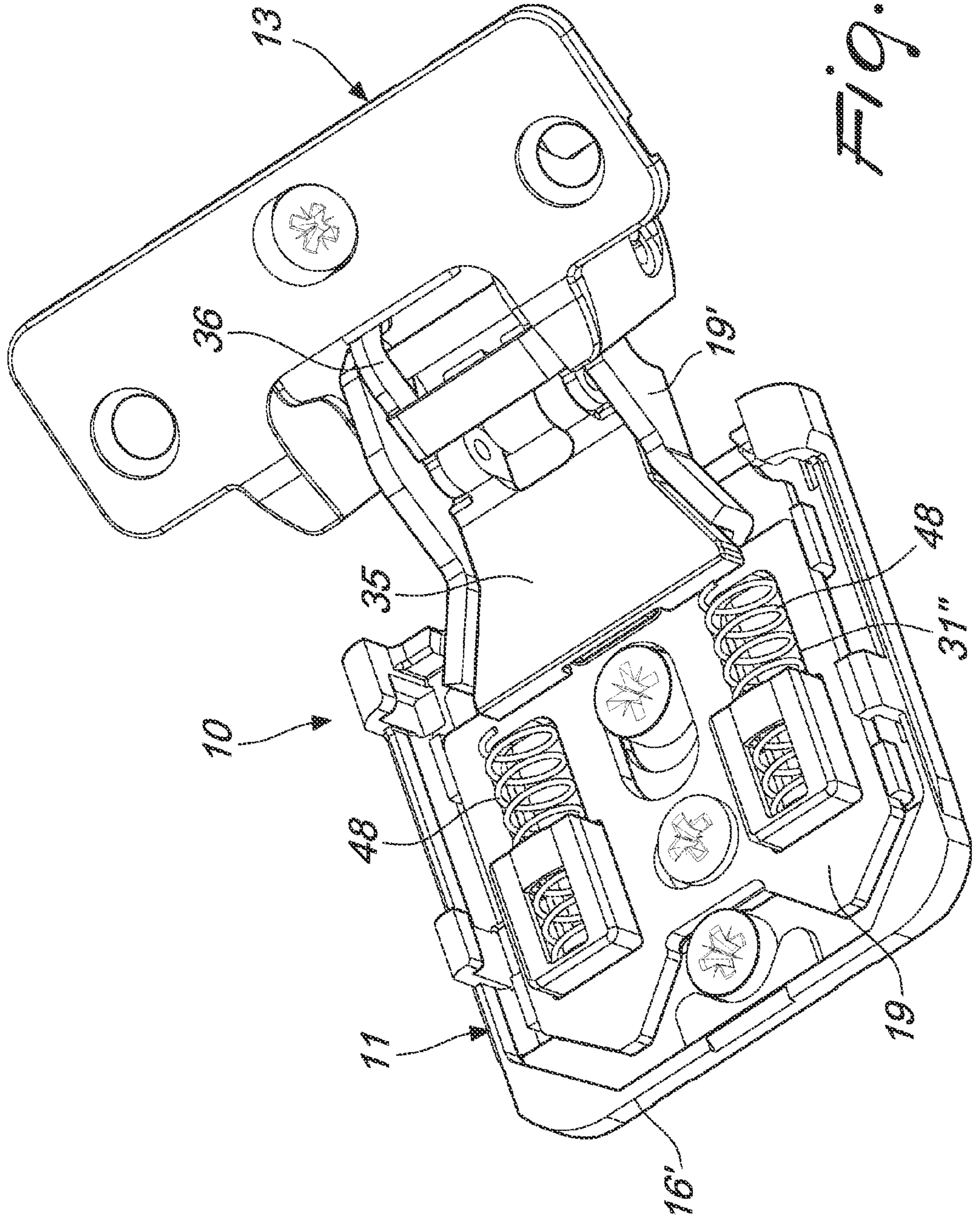
FIG. 9 is a perspective view of a second embodiment of the hinge according to the present invention.

FIG. 9 shows a second embodiment of the invention, in which the same reference numerals have been used to designate similar or equivalent parts.

In this embodiment, in place of the damping device, the hinge 10 comprises a different movement control device, in particular in the form of an elastic opening device that is capable of imposing a movement on the hinge in the direction of opening, for example along an angle comprised between 20° and 50°, starting from the closed position of the hinge; in this case the hinge does not comprise the elastic closing means 39, 40 which are in the first embodiment of the hinge.

In particular, the elastic opening device of the hinge 10 comprises at least one opening spring, preferably a first and a second opening spring 48 which are arranged parallel to each other in respective seats 31" provided at least in the second plate 19 so as to be substantially coplanar to that plate 19.

A first end of each spring 48 is arranged in a respective supporting element 49 which can be fixed in the seat 31" of the second plate 19, while the opposite end of the spring 48 protrudes toward the extension 19' of the plate 19 in order to come into contact directly or indirectly with a drive element 35 which is functionally connected to the movable part 13 of the hinge.

Indirect contact can for example occur if, at the end of the spring 48 directed toward the extension 19' of the plate 19, there is a tip element and/or a guide element on the spring, which is inserted on or in that spring in order to come into contact with the drive element 35.

Preferably the drive element 35 is in the form of a flat element that is arranged at the extension 19' of the second plate 19 and which can move so that it can slide parallel to the plate 19 and therefore along the plane of the body 16', 16" of the fixed part 11, so as to be able to act on the springs 48 in order to compress them and/or in order to be pushed by those springs 48.

The drive element 35 is functionally connected to the movable part 13 by way of a connecting lever 36 which is connected in an articulated manner to the drive element 35 and to the movable part 13, so as to define a crank mechanism that is capable of compressing the springs 48 during the closing movement of the hinge, for example along the final 20°-50° of the closing movement; in this manner the springs 48 are capable of imposing the aforementioned movement on the hinge in the direction of opening, after releasing a conventional retaining device for releasably retaining the door leaf in the closed position.

The possibility is not ruled out that the drive element and/or the means of functional connection with the movable part can be of a different type.

Figure 10:
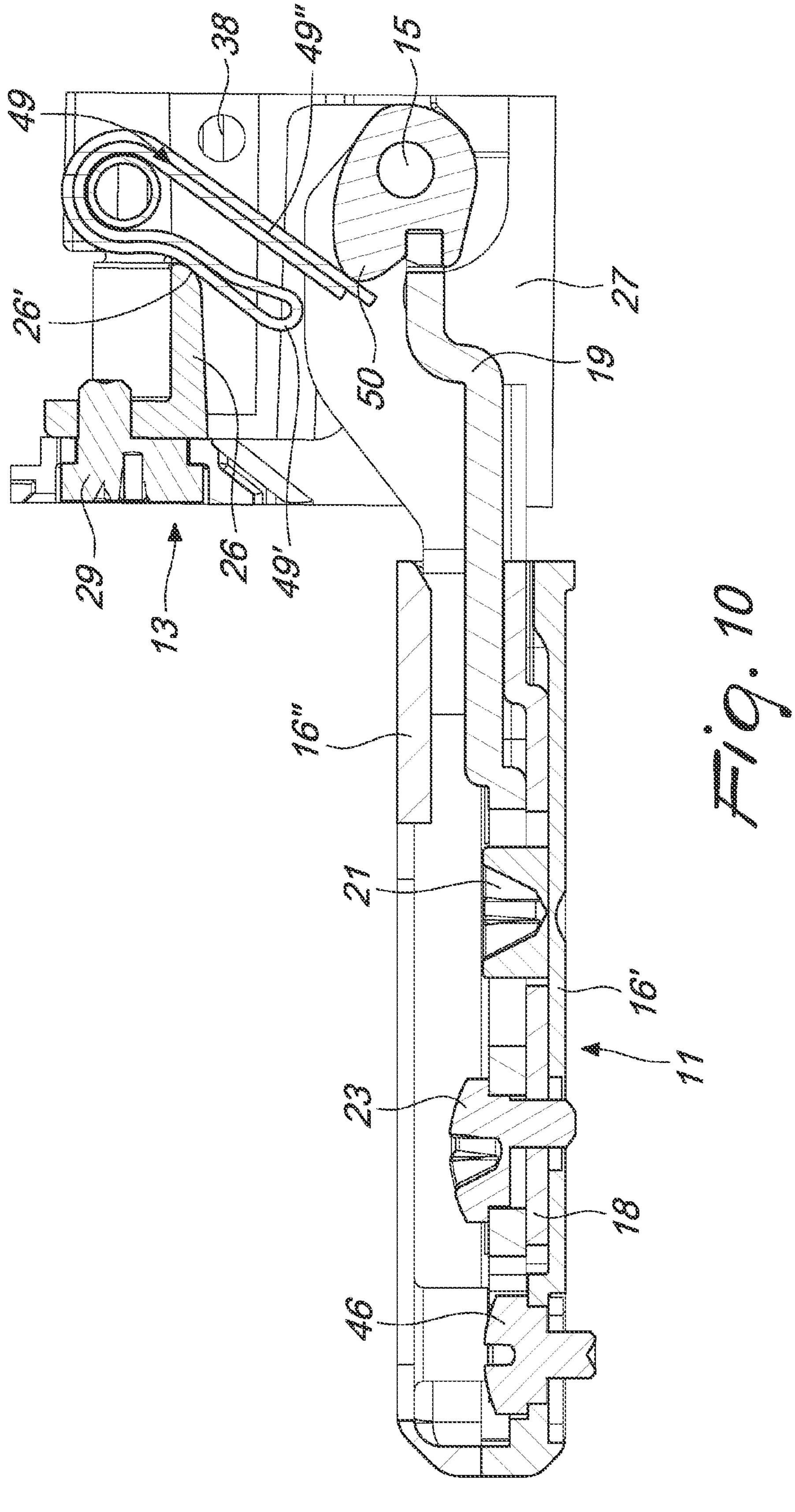
FIG. 10 is a longitudinal cross-sectional view of a third embodiment of the hinge according to the present invention.

FIG. 10 shows a third embodiment of the invention, in which the same reference numerals have been used to designate similar or equivalent parts.

In this further embodiment as well, in place of the damping device, the hinge 10 comprises a different movement control device, in particular in the form of an elastic opening device that is capable of imposing a movement on the hinge in the direction of opening, for example along an angle comprised between 20° and 50°, starting from the closed position of the hinge.

In this case the elastic opening device of the hinge 10 comprises a V-shaped spring 49, of the leaf or metallic wire type, which is contoured and arranged similarly or equal to the closing spring 39 in the first embodiment illustrated in FIGS. 1 to 8. In particular the opening spring 49 is arranged in the movable part 13, in particular in the first body 26; the spring 49 has a first elastic arm 49' which rests on a fixed abutment surface 26' of the body 26 and a second elastic arm 49" which acts on a cam 50, which is supported by the second plate 19 of the fixed part 11 at the articulation axis 15 and is shaped differently from the cam 39 of the first embodiment in order to generate a force acting in the direction of opening along an opening angle for example comprised between 0° and 50° starting from the closed position of the hinge.

In practice it has been found that the hinge according to the invention fully achieves the set aim and objects. In particular, it is clear that the hinge according to the invention is substantially invisible, in that it does not present encumbrances on the side wall of the item of furniture, being recessed in the thickness of that wall.

Furthermore, by virtue of the possibility of mounting more than two hinges, with the hinges according to the invention items of furniture can be made which have door leaves of considerable weight and dimensions, with a design that is innovative by virtue of the absence of elements of ironmongery visible on the side walls.

Likewise, the hinge according to the invention can be affixed to the item of furniture in a simple and rapid manner, and in terms of construction it is less complex than the conventional solutions.

The hinge and the item of furniture according to the invention are susceptible of numerous modifications and variations, all of which are within the scope of the appended claims. Moreover, all the details may be substituted by other, technically equivalent elements.

In practice the materials employed, and the contingent shapes and dimensions, may be any according to requirements and to the state of the art.

The disclosures in Italian Patent Application No. 102019000014091 from which this application claims priority are incorporated herein by reference.

The invention claimed is:

1. An invisible-type hinge for a door leaf of furniture which comprises a fixed part and a moveable part, the fixed part and moveable part being mutually connected so as to oscillate by at least one articulation axis, the moveable part connectable to the door leaf, the fixed part shaped to be insertable and fixable in a flat seat provided in a thickness of a side wall of the furniture, the fixed part comprising substantially flat housing body that extends along a plane parallel to, or passing through, the articulation axis, the hinge further comprising a movement control device for controlling a closing/opening movement of the hinge, said movement control device being in the form of (i) a damping device for damping the closing movement of the hinge or (ii) an elastic opening device for opening the hinge.

2. The hinge according to claim 1, wherein said movement control device is arranged in said flat body of the fixed part of the hinge and is functionally connected to the movable part of the hinge.

3. The hinge according to claim 2, wherein the movement control device comprises (i) the damping device for damping the closing movement of the hinge, the hinge further comprising elastic closing means for closing the hinge.

4. The hinge according to claim 3, wherein a first element and a second element of the fixed part, in the form of a first plate and a second plate, are arranged inside the housing body, the damping device comprising at least one fluid-operated damper which is arranged in a corresponding seat provided in at least one of said plates substantially coplanar to said plate.

5. The hinge according to claim 4, further comprising a drive element for said at least one damper, which is functionally connected to the movable part of the hinge, said drive element being movable in the plane of the fixed part in order to act on said at least one damper.

6. The hinge according to claim 2, wherein a first element and a second element of the fixed part, in the form of a first plate and a second plate, are arranged inside the housing body, the movement control device being in the form of (ii) the elastic opening device for opening the hinge which comprises at least one opening spring which is arranged in a corresponding seat which is provided in the second plate in order to be substantially coplanar to said plate, one end of said at least one spring being arranged to come into contact directly or indirectly with a drive element which is functionally connected to the movable part of the hinge.

7. The hinge according to claim 5, wherein said drive element is a flat sliding element and wherein there is a connecting lever which is connected in an articulated manner between said drive element and said movable part of the hinge.

8. The hinge according to claim 1, wherein the movement control device is in the form of (ii) the elastic opening device for opening the hinge which comprises a V-shaped spring, of a leaf or metallic wire type, arranged in the movable part of the hinge, an elastic arm of said spring acting on a cam which is supported by the fixed part at the articulation axis.

9. The hinge according to claim 3, wherein said elastic closing means for the hinge comprise a V-shaped spring, of the leaf or metallic wire type, arranged in the movable part, an arm of said spring acting on a cam which is supported by the fixed part of the hinge at the articulation axis.

10. The hinge according to claim 4, wherein the first element and the second element of the fixed part are arranged inside the housing body and are movable and adjustable with respect to each other and with respect to the housing body, one of said first and second elements being connected to the movable part of the hinge.

11. The hinge according to claim 10, wherein the housing body is formed by two flat half-shells that can be mutually coupled, a first half-shell having a seat for accommodating the first plate so that it can move in a first direction and can be shifted by way of a first cam screw, and wherein the first plate in turn has a seat for the second plate to slide, it being possible for said second plate to slide with respect to the first plate in a second direction, perpendicular to the first direction, and be shifted by way of a second cam screw.

12. The hinge according to claim 1, wherein the movable part comprises a first body which is connected, so that it can oscillate, to the articulation axis and a second body which is connected, so that it can move, to the first body and can be shifted by way of a cam screw.

13. The hinge according to claim 1, wherein the housing body of the fixed part has fastening means which can be fastened to at least one hollow retaining element which can be fixed in the flat seat which is provided in the thickness of the side wall.

14. The hinge according to claim 13, wherein the fastening means comprise a fastening plate which is supported so that it can move and can be driven on an outer side of the body and is provided with at least one hook in order to be engageable with at least one engagement protrusion or tooth which is provided inside the hollow retaining element.

15. An item of furniture which comprises at least one side wall and at least one door leaf which are mutually connected so as to oscillate by two or more hinges according to claim 1, wherein the side wall has two or more flat seats which are provided in a thickness of the side wall, coplanar to said side wall, and wherein the substantially flat housing body of the fixed part of each hinge is inserted and fixed in a respective flat seat which is provided in the thickness of the side wall of the item of furniture.

16. The item of furniture according to claim 15, wherein each flat seat provided in the thickness of the side wall has an insertion opening for the hinge which opens only on a front side of the side wall, and wherein the side wall has an access window on an inner side for access to adjustment and/or fixing members of the hinge, said window being closeable by a cover.

17. The item of furniture according to claim 15, wherein each flat seat provided in the thickness of the side wall has an insertion opening for the hinge which opens on the front side and on an inner or outer side of the side wall of the item of furniture, and further comprising a cover for covering the insertion opening of the flat seat.

* * * * *